US006266374B1

United States Patent
Choi

(10) Patent No.: US 6,266,374 B1
(45) Date of Patent: Jul. 24, 2001

(54) LOW LEVEL DIGITAL VIDEO DECODER FOR HDTV HAVING BACKWARD COMPATIBILITY

(75) Inventor: Sang-Hoon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/987,316

(22) Filed: Dec. 9, 1997

Related U.S. Application Data

(63) Continuation-in-part of application No. 08/547,839, filed on Oct. 25, 1995, now abandoned.

(30) Foreign Application Priority Data

Oct. 28, 1994 (KR) .................................................. 94/27943

(51) Int. Cl.[7] .................................................. H04N 7/18
(52) U.S. Cl. ............................... 375/240.21; 375/240.15; 375/240.16
(58) Field of Search .................................. 348/401, 402, 348/403, 404, 443, 433, 378, 395; 375/240.21, 240.16, 240.15

(56) References Cited

U.S. PATENT DOCUMENTS

| | | | |
|---|---|---|---|
| 5,412,741 | 5/1995 | Shapiro | 382/232 |
| 5,446,495 | 8/1995 | Tourtier et al. | 348/398 |
| 5,485,279 | 1/1996 | Yonemitsu et al. | 348/411 |
| 5,491,515 | 2/1996 | Suzuki | 348/401 |
| 5,491,561 | 2/1996 | Fukuda | 358/342 |
| 5,510,787 | 4/1996 | Koster | 341/76 |
| 5,528,299 | 6/1996 | Dufour et al. | 348/412 |
| 5,541,659 | 7/1996 | Kojima | 348/398 |

*Primary Examiner*—Andy Rao
(74) *Attorney, Agent, or Firm*—John P. White; Cooper & Dunham LLP

(57) ABSTRACT

A digital video decoding apparatus for a HDTV includes a variable length decoder (VLD) for variable-length decoding input compressed video data of upper or lower level, an inverse zigzag scan decoder IZZ for inverse zigzag-scan decoding the output data of the VLD, an inverse quantizer for inverse-quantizing the output data of the IZZ, a first inverse DCT for performing inverse DCT with respect to the output data of the inverse quantizer to output restored differential video data of upper level, a second inverse DCT for performing inverse DCT with respect to the output data of the inverse quantizer to output restored differential video data of a lower level, a frequency-divider for frequency-dividing-by-two the motion vector values of upper level output from the VLD, a motion compensator for receiving the motion vector values of low level output from the VLD, the previous restored video data or the motion vector values of high level output from the frequency-divider and the previous restored video data output from a second two-dimensional filter to output motion-compensated data for each changed picture, and a frame memory for storing and outputting restored video data obtained by adding the motion-compensated data of the motion compensator with restored differential video data output from the second IDCT, or for storing and outputting restored video data obtained by adding the motion-compensated data of the motion compensator with the restored differential video data output from the first IDCT and output from a first 2D filter.

7 Claims, 6 Drawing Sheets

FIG.2

| BIT STREAM | | HP@HL | HP@HL-14 | HP@ML | spatial@H-14 | SNR@ML | SNR@LL | MP@HL | MP@H-14 | MP@ML | MP@LL | SP@ML |
|---|---|---|---|---|---|---|---|---|---|---|---|---|
| HP@HL | | X | | | | | | | | | | |
| HP@H-14 | | X | X | | | | | | | | | |
| HP@ML | | X | X | X | | | | | | | | |
| spatial@H-14 | | X | X | | X | | | | | | | |
| | BASE LAYER | X | X | X | X | X | | | | | | |
| SNR@ML | | X | X | X | X | X | | | | | | |
| | BASE LAYER | X | X | X | X | X | X | | | | | |
| SNR@LL | | X | X | X | X | X | X | | | | | |
| | BASE LAYER | X | | | | | | | | | | |
| MP@HL | | X | X | | | X | | X | | | | |
| MP@H-14 | | X | X | X | X | X | | X | X | | | |
| MP@ML | | X | X | X | X | X | | X | X | X | | |
| MP@LL | | X | X | X | X | X | X | X | X | X | X | |
| SP@ML | | X | X | X | X | X | | X | X | X | | X |
| ISO/IEC 11172 | | X | X | X | X | X | X | X | X | X | X | X |

DECODER

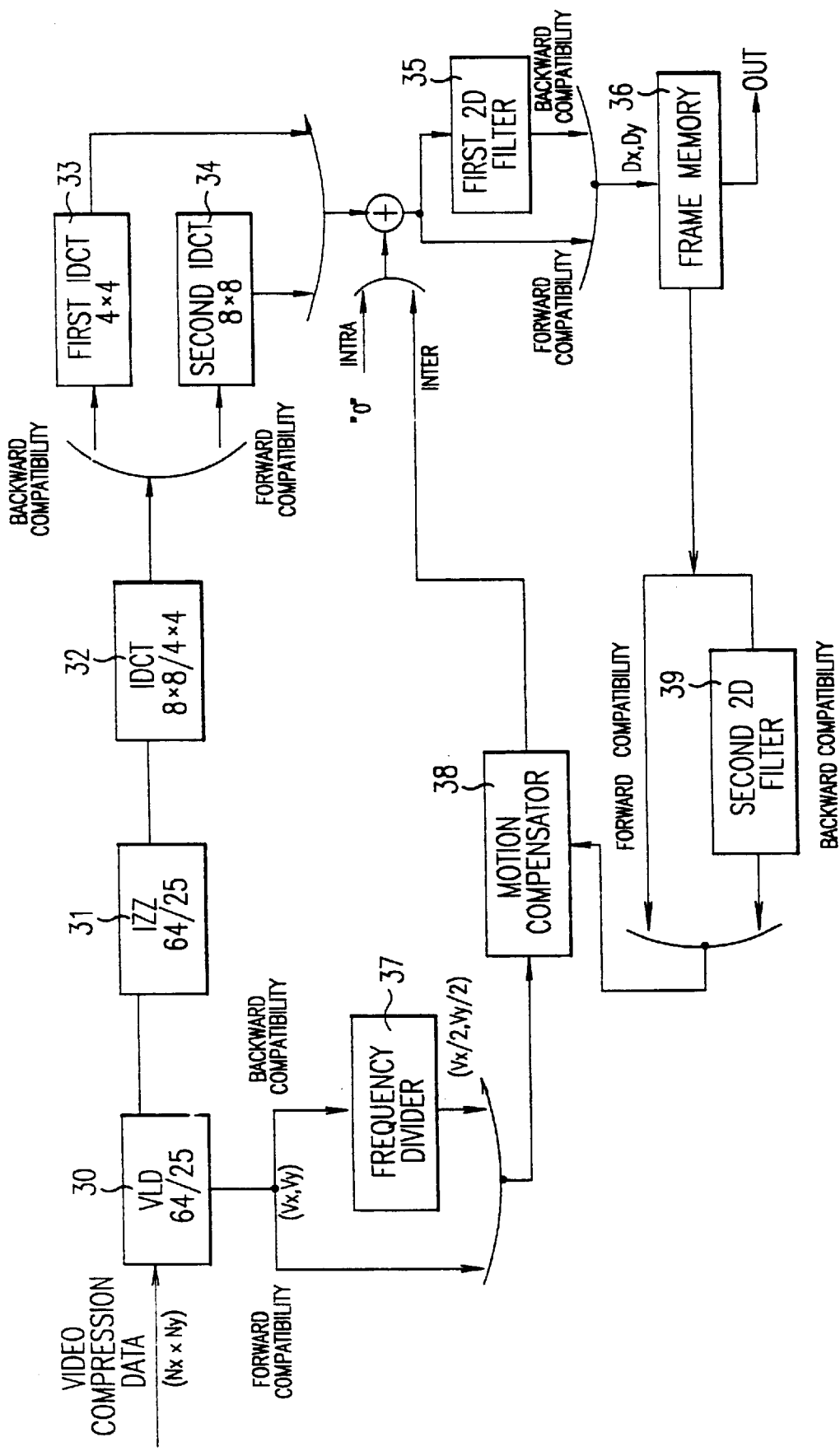
F I G. 3A

_US 6,266,374 B1_

LOW LEVEL DIGITAL VIDEO DECODER FOR HDTV HAVING BACKWARD COMPATIBILITY

This application is a continuation-in-part of U.S. Ser. No. 08/547,839, filed Oct. 25, 1995 now ABN.

BACKGROUND OF THE INVENTION

The present invention relates to a digital video signal processor for a high definition television (HDTV), and more particularly, to a digital video decoding apparatus for a HDTV which allows a decoding performance with respect to a profile having larger than the bandwidth which can be processed by the decoding apparatus, by reducing the calculating amount concerning the restoration of discrete cosine transform (DCT) coefficients.

In general, a frame of a digital video signal is composed of an I-frame for processing compressed video data by using purely spatial transform without motion compensation, a P-frame for processing compressed video data by motion compensation using a forward motion vector, and a B-frame for performing more efficient video compression by selectively using a forward motion vector or a backward motion vector.

A recently standardized digital motion picture coding method has been widely adopted in various fields such as a video phone, CD-I (compact disk-interactive), DBS or ATV (advanced television).

Among various digital motion picture coding methods, the specifications for H.261 and (moving picture experts group) MPEG I are determined and are actively used in various fields. Recently, moving picture experts Group (MPEG) II has been proposed and is about to be settled.

A conventional digital video decoder for a HDTV will be described with reference to the accompanying drawings.

As shown in FIG. 1, the conventional digital video decoder for HDTV performs variable length decoding in a variable length decoder (VLD) with respect to input compressed video data (bit stream), thereby obtaining DCT coefficient information and motion vector and information on motion vector and picture coding relating to I-, P- and B-frames to then be restored into an original code value.

The DCT coefficient information passes through a inverse zigzag scan decoder (IZZ) 2, an inverse quantizer 3, and an inverse DCT 4 to be restored as pixel information. In the case of an I-frame, the pixel information is stored in a frame memory 5 using picture coding information. In the case of a P-frame or a B-frame, the current picture (restored video data) is constituted by the information obtained by adding the previous pixel information stored in frame memory 5 with the pixel information compensated in a motion compensator 6 using the motion vector obtained in the variable length coding step.

At this time, unless an error is generated during the picture restoration step, the frame memory picture of an encoder becomes the same as the frame memory value of a decoder.

The picture stored in frame memory 5 is output via a display memory (not shown) to be displayed in the different sequence according to types of pictures.

FIG. 1 shows a digital video decoder for a HDTV in general motion picture coding techniques.

According to the conventional digital video decoder, compressed video data having a bit rate lower than the bandwidth capable by the decoder can be processed without a serious problem. However, it is impossible to process the compressed video data generated from the picture having an amplitude larger than that capable by the decoder, due to the hardware capability of the decoder and limited memory.

In other words, as to the compatibility of compressed video data with a decoder, which can be widely adopted in various applicable fields, the MPEG II standards specify the syntactic properties of the compressed video data which can be decoded by the decoder and restrictive conditions of pictures to be processed, by using various profiles and levels.

The profiles and levels of the compressed video data to be actively used by MPEG II are a main profile and main level (MP@ML) adoptable for DBS and VOD (video on demand), and a main profile and high level (MP@HL) adoptable for HDTVs.

These two types of compressed video data are the same with each other in the syntactic properties but are different in the restrictive conditions for the pictures to be processed. Specifically, the amplitudes of the coded pictures are different.

For example, the maximum picture adopted for HDTV (MP@HL) is 1920×1152 and 60 frames/sec, and the maximum picture adopted for DBS is 720×576 and 30 frames/sec.

As shown in FIG. 2 which tabulates the compatibility between a number of decoders and compressed video data of assorted profiles and levels in MPEG II, the decoder for supporting the compressed video data of upper levels in the same profile should decode the compressed video data of lower levels as well as that of its own level.

In this manner, in decoding the compressed video data having different levels in the same profile, the decoder for supporting the compressed video data of upper levels can accommodate that of lower levels, but not that of higher levels.

In other words, forward compatibility is assured but backward compatibility is not.

SUMMARY OF THE INVENTION

To solve the backward compatibility problems of the prior art, it is an object of the present invention to provide a digital video decoder for a HDTV which can realize backward compatibility.

To accomplish the above object, there is provided a digital video decoding apparatus for a HDTV comprising: a variable length decoder (VLD) for variable-length decoding input compressed video data of upper or lower level; an inverse zigzag scan decoder (IZZ) for zigzag-scan decoding the output data of the VLD; an inverse quantizer for inverse-quantization converting the output data of the IZZ; a first inverse DCT (1IDCT) for performing inverse DCT with respect to the output data of the inverse quantizer to output restored differential video data of an upper level; a second inverse DCT (2IDCT) for performing inverse DCT with respect to the output data of the inverse quantizer to output restored differential video data of a lower level; a frequency-divider for frequency-dividing-by-two the motion vector (MV) values of upper level output from the VLD; a motion compensator for receiving the motion vector (MV) values of low level output from the VLD, the previous restored video data or the motion vector (MV) values of high level output from the frequency-divider and the previous restored video data output from a second two-dimensional (2D) filter to output motion-compensated data for each changed picture;

and a frame memory for storing and outputting restored video data obtained by adding the motion-compensated data of the motion compensator with the restored differential video data output from the second IDCT, or for storing and outputting restored video data obtained by adding the motion-compensated data of the motion compensator with the restored differential video data output from the first IDCT and output from a first 2D filter.

The invention further provides a low level digital video decoder for an HDTV, which decodes high level image data received from digital broadcasting data to low level image data, the low level digital video decoder for an HDTV comprising: decoding means for decoding a predetermined portion of the high level image data; memory means for storing the decoded image data; to high filtering means for converting the decoded image data to high data level data or standard level data suitable for the size of the image data to be displayed to store it and converting the image data stored in the memory means to original data to output it to the decoding means.

The invention further provides a decoding method of a low level digital video decoder for an HDTV, which decodes high level image data received from digital broadcasting data to low level image data, the decoding method comprising the steps of: decoding high level image data Nx * Ny to low level image data Nx/2 * Ny/2; and converting the low level image data Nx/2 * Ny/2 to display image data Dx * Dy to store it in memory means and at the same time converting the display image data Dx * Dy stored in the memory means to the low level image data Nx/2 * Ny/2.

BRIEF DESCRIPTION OF THE DRAWINGS

The above objects and advantages of the present invention will become more apparent by describing in detail a preferred embodiment thereof with reference to the attached drawings in which:

FIG. 2 is a table stipulating forward compatibility in MPEG II;

FIG. 3A is a schematic block diagram of a digital video decoder for a HDTV according to the present invention;

FIG. 4b is a flowchart illustrating data shown in FIG. 4a; and

FIG. 4c is a schematic block diagram of a filter shown in FIG. 4a.

DETAILED DESCRIPTION OF THE INVENTION

Figure 1:
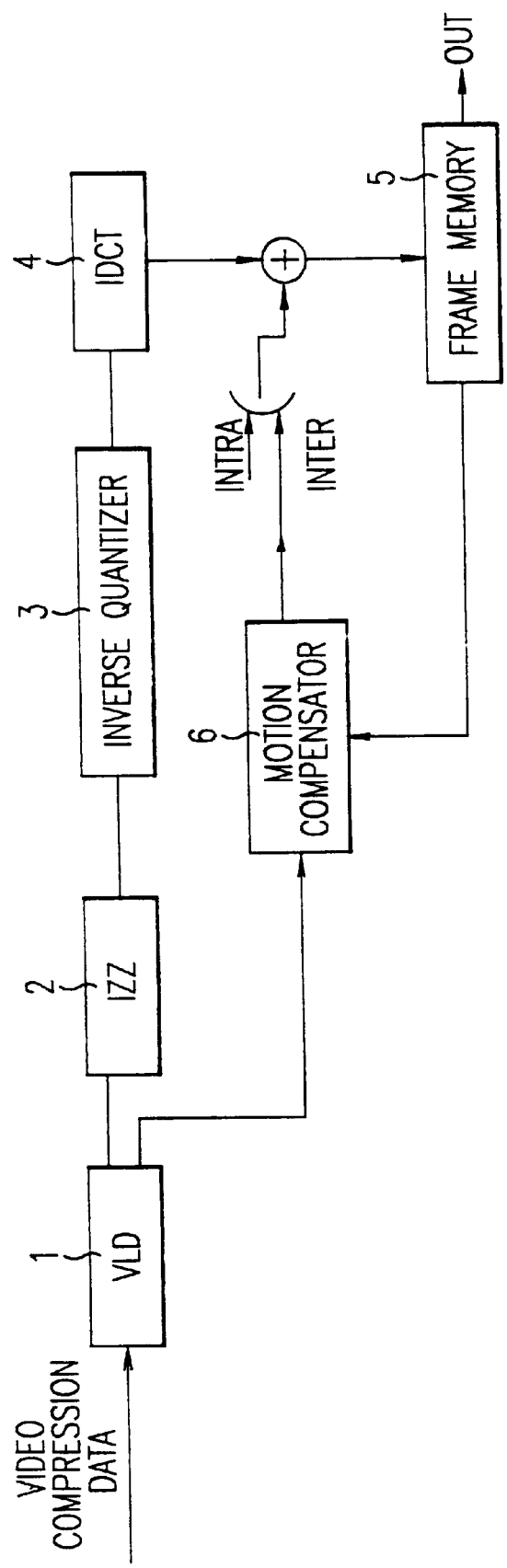
FIG. 1 is a schematic block diagram of a conventional digital video decoder for a HDTV.
Figure 3B:
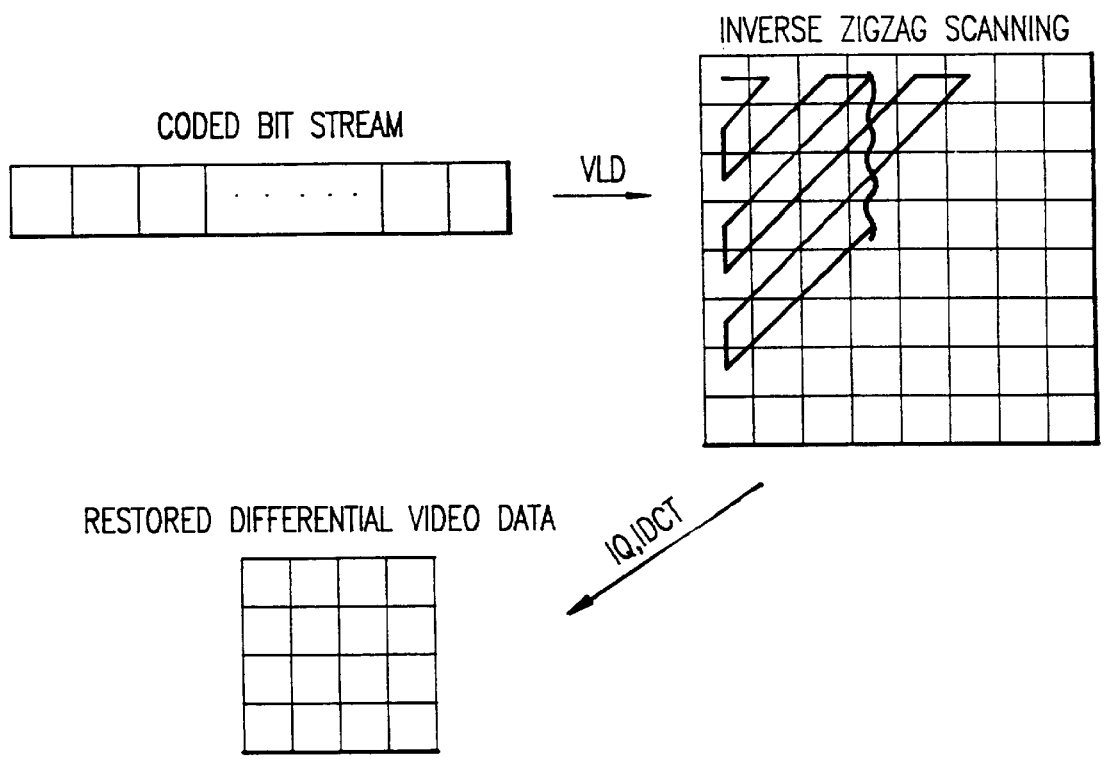
FIG. 3B is a flowchart illustrating data shown in FIG. 3A.

As shown in FIG. 3A, the digital video decoder for a HDTV according to the present invention includes a variable length decoder (VLD) 30 for variable-length decoding input compressed video data of upper or lower level, an inverse zigzag scan decoder (IZZ) 31 for zigzag-scan decoding the output data of VLD 30, an inverse quantizer 32 for inverse-quantization converting the output data of IZZ 31, a first 4×4 inverse DCT (1IDCT) 33 for performing inverse DCT with respect to the output data of inverse quantizer 32 to output restored differential video data of an upper level, a second 8×8 inverse DCT (2IDCT) 34 for performing inverse DCT with respect to the output data of inverse quantizer 32 to output restored differential video data of a lower level, a frequency-divider 37 for frequency-dividing the motion vector (MV) values ($V_x$, $V_y$) of upper level output from VLD 30 into a half size, a motion compensator 38 for receiving the motion vector (MV) values ($V_x$, $V_y$) of low level output from VLD 30, the previous restored video data stored and output from a frame memory 36 or the motion vector (MV) values ($V_x/2$, $V_y/2$) of upper level output from frequency-divider 37 and the previous restored video data output from a second two-dimensional (2D) filter 39 to output motion-compensated data for each changed picture, and frame memory 36 for storing and outputting restored video data ($D_x$, $D_y$) obtained by adding the motion-compensated data of motion compensator 38 with the restored differential video data output from second IDCT 34, or for storing and outputting restored video data ($D_x$, $D_y$) obtained by adding the motion-compensated data of motion compensator 38 with the restored differential video data output from first IDCT 33 and output from a first 2D filter 35.

Figure 3C:
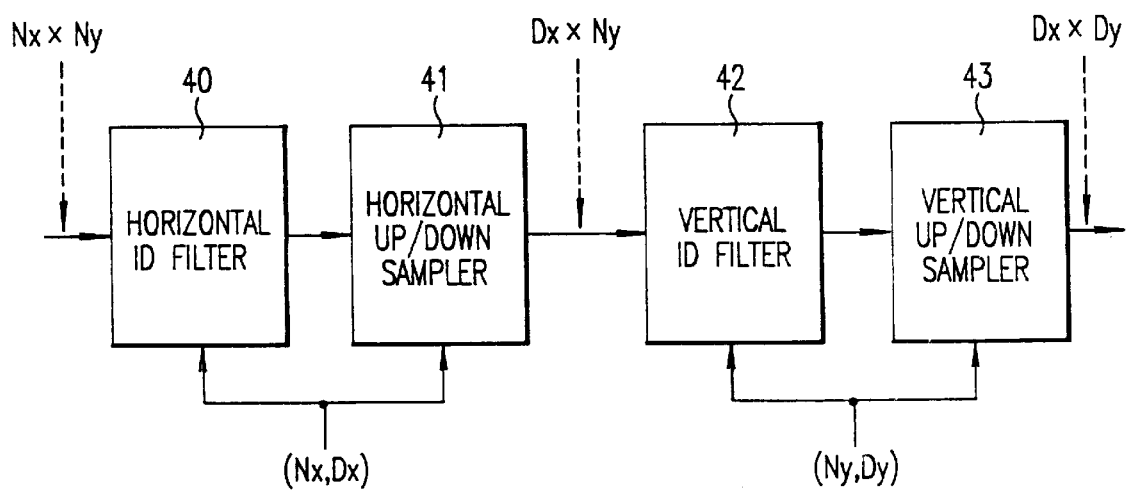
FIG. 3C is a schematic block diagram of a two-dimensional filter shown in FIG. 3A.
Figure 4A:
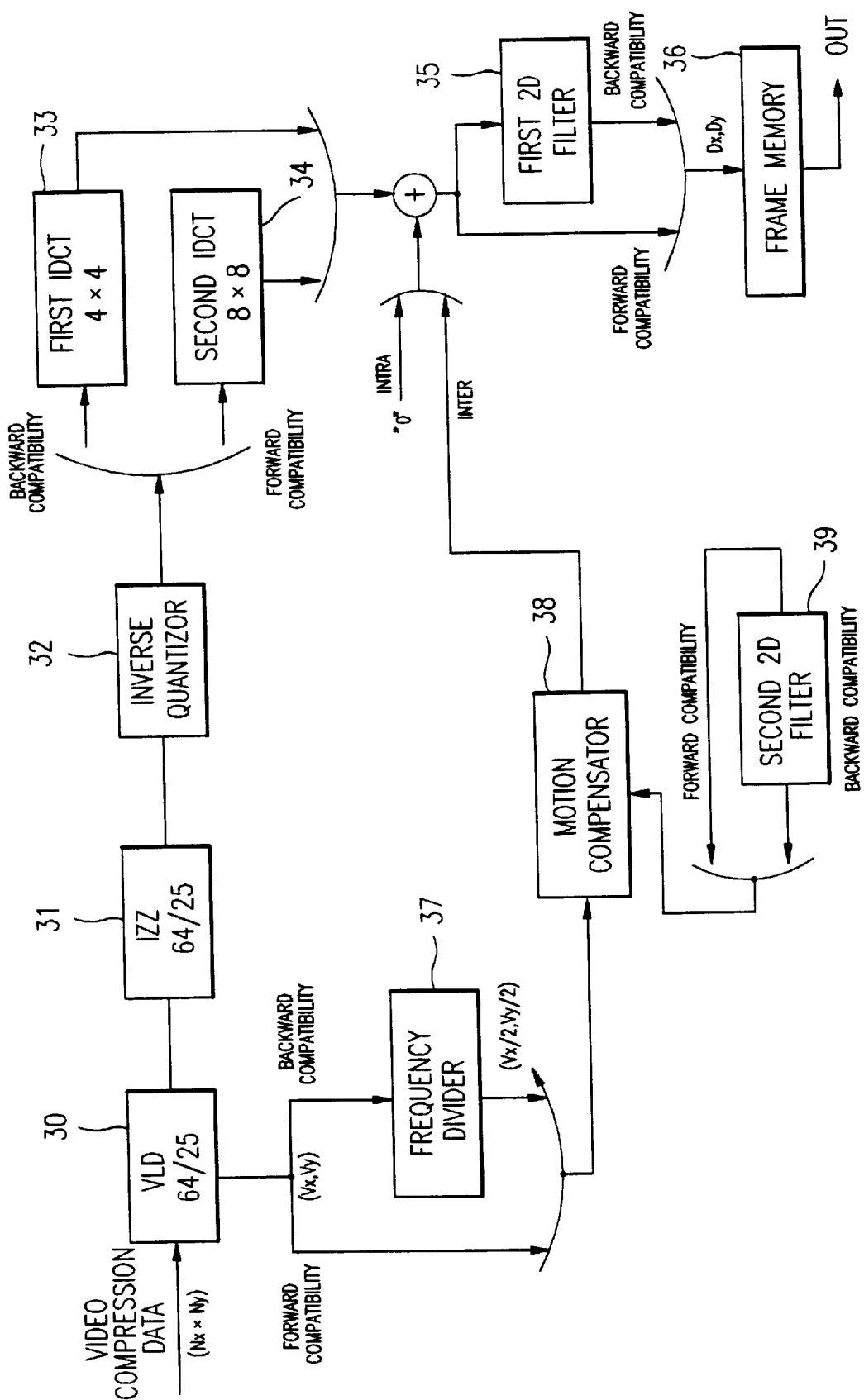
FIG. 4a is a schematic block diagram of a low level digital video decoder for a HDTV according to the present invention.
Figure 4B:
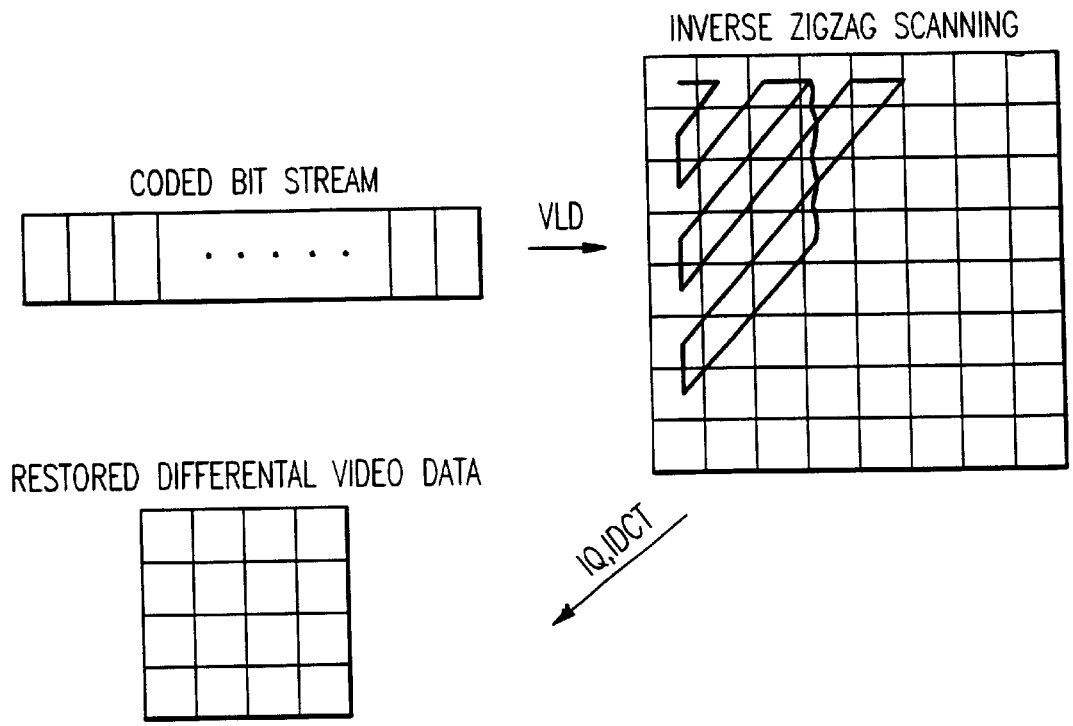
Figure 4C:
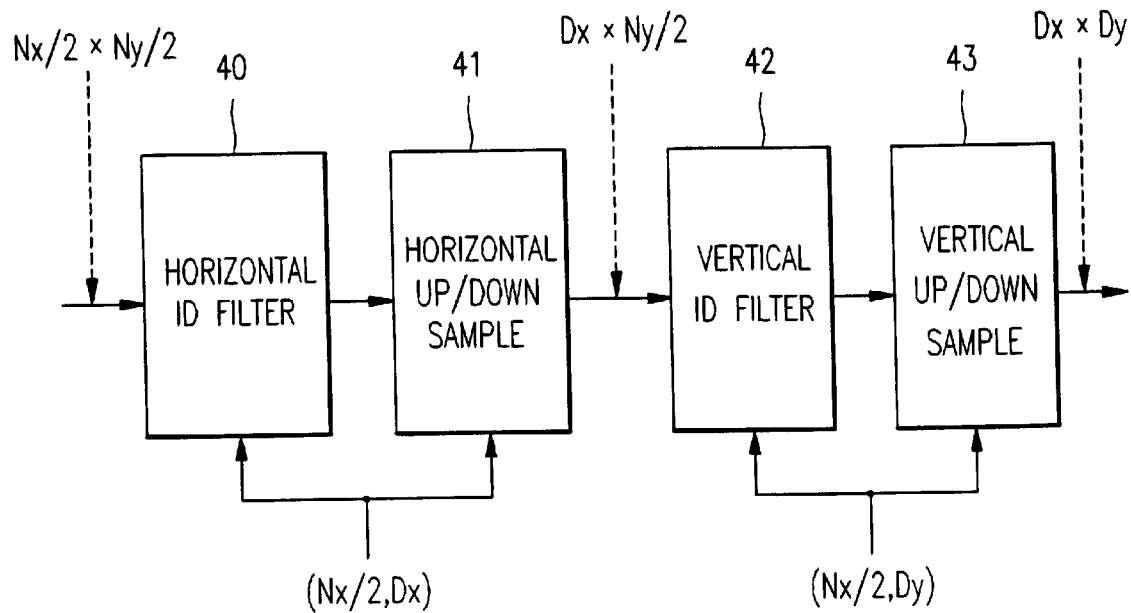

To be more detail, as shown in FIG. 3C, first 2D filter 34 and second 2D filter 39 each includes a horizontal one-dimensional (1D) filter 40 for filtering horizontal restored video data, a horizontal up/down sampler 41 for sampling-rate converting the output signal of horizontal one-dimensional (1D) filter 40, a vertical one-dimensional (1D) filter 42 for receiving the output signal of horizontal up/down sampler 41 and filtering vertical restored video data, and a vertical up/down sampler 43 for sampling-rate converting the output signal of vertical one-dimensional (1D) filter 42.

In another embodiment, the present invention includes a low level digital video decoder for an HDTV, which decodes high level image data received from digital broadcasting data to low level image data. The low level digital video decoder for an HDTV includes decoding means for decoding a predetermined portion of the high level image data, memory means for storing the decoded image data, and filtering means for converting the decoded image data to high level data or standard level data suitable for the size of the image data to be displayed to store it and converting the image data stored in the memory means to original data to output it to the decoding means.

In yet another embodiment, the present invention includes a decoding method of a low level digital video decoder for an HDTV, which decodes high level image data received from digital broadcasting data to low level image data. The decoding method comprising the steps of decoding high level image data Nx * Ny to low level image data Nx/2 * Ny/2 and converting the low level image data Nx/2 * Ny/2 to display image data Dx * Dy to store it in memory means and at the same time converting the display image data Dx * Dy stored in the memory means to the low level image data Nx/2 * Ny/2.

The present invention provides a low level digital video decoder for an HDTV which decodes high level data and a method for decoding a low level image data to high level image data using a backward compatibility outputted from filtering means.

In the digital video decoder for a HDTV according to the present invention having the aforementioned configuration, the operation of each block depending on its upper or lower level is selected by the picture coding information filtered from input compressed video data and coefficient information.

Also, this structure allows the reduction of the calculation amount concerning the DCT coefficient restoration occupying the most capacity, from the information processed by the decoder.

At this time, the numeral values (64/25) expressed in the blocks of VLD 30 and IZZ 31 are for comparing the quantized DCT coefficient necessary for performing a 4×4 IDCT with the number necessary for performing a conventional 8×8 IDCT.

In other words, 25 represents the number necessary for constituting 4×4 coefficients since the coefficients are coded in a zigzag sequence in order to increase the coding efficiency of the coefficients quantized by an encoder.

Therefore, for assuring the backward compatibility, i.e., during processing compressed video data of upper level, the data processing of the digital video decoder according to the present invention operates in the following way. First, with respect to compressed video data for an input $N_x \times N_y$ picture, $VLD_{25}$, $IZZ_{25}$, $IQ_4 \times_4$ and $IDCTT_4 \times_4$ (in the case of compressed video data of upper level which can be precessed) are performed, thereby obtaining restored differential video data having an amplitude of $N_x/2 \times N_y/2$.

The motion-compensated data of motion compensator 38 is added with the restored differential video data having an amplitude of $N_x/2 \times N_y/2$ to then be applied to first 2D filter 35.

First 2D filter 35 independently filters by a relative ratio of axes X and Y with respect to a $D_x \times D_y$ picture and then performs a sampling-rate conversion in the following manner:

filtering of axis X means reduction if $N_x/2$ is greater than $D_x$;

filtering of axis X means interpolation if $N_x/2$ is smaller than $D_x$;

filtering of axis Y means reduction if $N_y/2$ is greater than $D_y$; and filtering of axis Y means interpolation if $N_y/2$ is smaller than $D_y$.

The restored differential video data having an amplitude of $D_x \times D_y$ of first 2D filter 35 is stored in frame memory 36 to be output.

If the MV value output from VLD 30 is the one $(V_x, V_y)$ of upper level, the value is divided by two by means of frequency-divider 36 to become a value $(V_x/2, V_y/2)$ to then be applied to motion compensator 38.

Motion compensator 38 outputs motion-compensated data for each changed picture by the previous restored video data of upper level input through second 2D filter 39 or the one of lower level directly input from frame memory 36, and the motion vector (MV) value.

As described above, the digital video decoder for a HDTV according to the present invention, which can assure backward compatibility, allows the decoding of the profile having a larger than the bandwidth which can be processed by the decoder, thereby facilitating to render various types of video service for the future.

That is to say, an MP@ML coded program and MP@HL compressed video data, adopted in a HDTV can be received by using a DBS receiver (lower level) which can process MP@ML compressed video data.

Therefore, the digital video decoder according to the present invention can offer a useful video service currently, that is, in case when HDTV receivers are not widely adopted. Also, it can be used for low-priced HDTV receivers as decoding means.

What is claimed is:

1. A digital video decoding apparatus for a HDTV comprising:

a variable length decoder (VLD) for variable-length decoding input compressed video data of upper or lower level;

an inverse zigzag scan decoder (IZZ) for zigzag-scan decoding the output data of said VLD;

an inverse quantizer for inverse-quantization converting the output data of said IZZ;

a first inverse DCT (1IDCT) for performing inverse DCT with respect to the output data of said inverse quantizer to output restored differential video data of an upper level;

a second inverse DCT (2IDCT) for performing inverse DCT with respect to the output data of said inverse quantizer to output restored differential video data of a lower level;

a frequency-divider for frequency-dividing-by-two the motion vector (MV) values of upper level output from said VLD;

a motion compensator for receiving the motion vector (MV) values of low level output from said VLD, the previous restored video data or the motion vector (MV) values of high level output from said frequency-divider and the previous restored video data output from a second two-dimensional (2D) filter to output motion-compensation data for each changed picture; and a frame memory for storing and outputting a restored video data obtained either by adding the motion-compensated data from said motion compensator to the restored differential video data from said second IDCT, or by adding the motion-compensated data from said motion compensator to the restored differential video data from said first IDCT and respectively subjecting to filtering and sampling rate conversion according to ratios relative to X- and Y-axis sizes of a video to be restored.

2. A digital video decoding apparatus for a HDTV as claimed in claime 1, wherein first and second two-dimension filters each comprises:

a horizontal one-dimensional (1D) filter for filtering horizontal restored video data;

a horizontal up/down sampler for sampling-rate converting the output signal of said horizontal one-dimensional (1D) filter;

a vertical one-dimensional (1D) filter for receiving the output signal of said horizontal up/down sampler and filtering said vertical restored video data; and a vertical up/down sampler for sampling-rate converting the output signal of said vertical one-dimensional (1D) filter.

3. A digital video decoding apparatus for a HDTV as claimed in claime 1, wherein the previous restored video data directly input to said second 2D filter or to said motion compensator is output from said frame memory.

4. A digital video decoding apparatus for a HDTV as claimed in claime 1, wherein the operation of each block depending on a upper or lower level is selected by picture coding information filtered from input compressed video data and coefficient information.

5. A digital video decoding apparatus for a HDTV whose backward compatibility and forward compatibility are assured, said apparatus comprising:

forward compatibility means for restoring compressed video data, by variable-length decoding input compressed video data, restoring DCT coefficient information and picture coding information for I-, P- and B-frames to restore pixel information from said restored DCT coefficient information by sequentially performing inverse zigzag scan decoding, inverse quantization conversion and IDCT, frequency-dividing the motion vector value obtained in said variable-length coding process into a half size, performing motion-compensation using the frequency-divided motion vector and two dimensional filtered previous pixel information and then restored pixel said P- and B-frames and then adding said motion compensated pixel information; and backward compatibility means for restoring compressed video data, by variable-length decoding a received compressed video data to restore DCT coefficient information and a motion vector, restoring pixel information by subjecting the restored DCT coefficient information to inverse zigzag scan decoding, inverse quantization conversion and IDCT in succession frequency-dividing the motion vector obtained in the variable-length decoding into a half size, subjecting the pixel information to motion compensation using the frequency divided motion vector and prior pixel information having subjected to filtering and sampling rate conversion, adding the motion-compensated pixel information to the restored pixel information in the IDCT, and respectively subjecting to filtering and sampling rate conversion according to ratios relative to X- and Y-axis of a video to be restored.

6. A digital video decoding apparatus for a HDTV whose backward compatibilty and forward compatibilty are assured, where said backward compatibilty means comprising:

a variable length decoder (VLD) for variable-length decoding input compressed video data of upper level;

an inverse zigzag scan decoder (IZZ) for zigzag-scan decoding the output data of said VLD;

an inverse quantizer for inverse-quantization converting the output data of said IZZ;

an inverse DCT (1IDCT) for performing inverse DCT with respect to the output data of said inverse quantizer to output restored differential video data of an upper level;

a first two-dimensional filter for independently performing filtering and sampling-rate conversion in a relative ratio of axes X and Y with respect to the picture to be restored as a picture after adding motion-compensated data with said restored differential video data output from said DCT;

a second two-dimensional filter for performing filtering and sampling-rate conversion with respect to said previous restored video data;

a frequency-divider for frequency-dividing the motion vector values of upper level output from said VLD into a predetermined size;

a motion compensator for receiving the motion vector values of low level output from said frequency-divider and the previous restored video data output from said second two-dimensional (2D) filter to output motion-compensated data for each changed picture; and a frame memory for storing and outputting restored video data output from said first 2D filter.

7. A decoding method of a low level digital video decoder for an HDTV, which decodes high level image data received from digital broadcasting data to low level image data, the decoding method comprising the steps of:

decoding high level image data Nx * Ny to low level image data Nx/2 * Ny/2; and filtering and sampling rate converting the low level image data Nx/2 * Ny/2 to display image data Dx * Dy to store it in memory means and at the same time converting the display image data Dx * Dy stored in the memory means to the low level image data Nx/2 * Ny/2.

* * * * *